US009145898B2

(12) United States Patent
Laffler et al.

(10) Patent No.: US 9,145,898 B2
(45) Date of Patent: Sep. 29, 2015

(54) MODIFIED HEAT CHAMBER AND METHOD TO IMPROVE HEAT CYCLE EFFICIENCY USING AIRFLOW CONTROL

(71) Applicants: Donald L. Laffler, El Paso, TX (US); James T. Hardin, Corona, NM (US)

(72) Inventors: Donald L. Laffler, El Paso, TX (US); James T. Hardin, Corona, NM (US)

( * ) Notice: Subject to any disclaimer, the term of this patent is extended or adjusted under 35 U.S.C. 154(b) by 287 days.

(21) Appl. No.: 13/794,790

(22) Filed: Mar. 12, 2013

(65) Prior Publication Data

US 2014/0271102 A1 Sep. 18, 2014

(51) Int. Cl.

| | |
|---|---|
| ***H05B 6/68*** | (2006.01) |
| ***A21B 1/26*** | (2006.01) |
| ***F04D 27/00*** | (2006.01) |
| ***F26B 21/02*** | (2006.01) |
| ***F26B 21/12*** | (2006.01) |

(52) U.S. Cl.

CPC ............ *F04D 27/007* (2013.01); *F26B 21/026* (2013.01); *F26B 21/12* (2013.01)

(58) Field of Classification Search

CPC ........ F26B 17/16; F26B 21/026; F26B 21/12; F04D 27/007

USPC ......... 219/607, 681, 757, 400, 401, 385, 386, 219/396, 393, 492, 682, 683, 409, 413, 497, 219/606, 608, 680, 685, 702, 720, 721, 722, 219/723, 724, 725, 758; 426/523, 590, 510, 426/511; 126/21 A, 21 R, 299 R; 99/476, 99/330, 337, 340, 342, 467–473, 474–475, 99/DIG. 14, 451, 325; 432/147, 121, 143, 432/148, 146, 209; 216/21 A, 19 R, 91 A, 216/90 R, 11, 110 B, 197; 415/1, 51

See application file for complete search history.

(56) References Cited

U.S. PATENT DOCUMENTS

| | | | | |
|---|---|---|---|---|
| 4,108,139 | A * | 8/1978 | Gilliom et al. | 126/21 A |
| 5,588,830 | A * | 12/1996 | Josefsson et al. | 432/147 |
| 2001/0003337 | A1* | 6/2001 | Kim et al. | 219/681 |
| 2007/0267018 | A1* | 11/2007 | Paller | 128/204.23 |

FOREIGN PATENT DOCUMENTS

JP 2000329351 A * 11/2000

OTHER PUBLICATIONS

Kuroda, Ikuo, Convection cooking oven for food stuff, Nov. 30, 2000, English translation, http://dossier1.ipdl.inpit.go.jp/cgi-bin/tran_tran_web_cgi_ejje.*

* cited by examiner

*Primary Examiner* — Quang Van

(74) *Attorney, Agent, or Firm* — J. Todd Rushton

(57) ABSTRACT

The present invention relates to improvements in the art of operating large heat chambers so as to reduce both the time and the cost required for heating materials. More specifically, the modified heat chamber of the present invention provides a programmable control mechanism capable of significantly reducing areas with temperature variations or hot and cold spots. A programmable heat chamber leads to significant reductions in the required processing time and in the cost of the required energy.

7 Claims, 4 Drawing Sheets

MODIFIED HEAT CHAMBER AND METHOD TO IMPROVE HEAT CYCLE EFFICIENCY USING AIRFLOW CONTROL

This application claims priority to U.S. Provisional Application 61/667,995 filed Jul. 4, 2012, the disclosure incorporated by reference.

BACKGROUND

Traditional large heat chambers operate by delivering heat energy to materials by one or a combination of radiant heat, hot air convection or hot forced air. The configuration of the heat delivery mechanism is generally fixed by the chamber designer. The chamber users can usually only select heating time and temperature for a specific application. These parameters are determined experimentally by using instrumentation and running test loads of materials. This method is satisfactorily but may not produce as economical process as may be achieved using other methods.

A particular load configuration with a fixed airflow velocity and direction in forced hot air heat chambers often produces uneven heating with hot and cold spots. The hot and cold spots may be a significant issue when a product or process requires achieving a specific or a narrow allowable temperature band. In some instances a product may not achieve a proper dryness, temperature, consistency, condition, state or strength. This may require reheating a product, poor product preservation, unusable product, product loss or poor final product performance. In most cases, the input hot air temperature can be lowered to a level equal to, or just above, final maximum acceptable temperature and the heating time increased to prevent material in the hot spots from exceeding the maximum allowed. The heating time can also be adjusted to get the material in the cold spots up to the specified minimum temperature. These solutions may not be as energy efficient or produce the as good as results and might otherwise be achieved.

SUMMARY OF THE INVENTION

The present invention relates to improvements in the art of operating large heat chambers so as to reduce both the time and the cost required for heating materials. More specifically, the modified heat chamber of the present invention provides a programmable control mechanism capable of significantly reducing areas with temperature variations or hot and cold spots. A programmable heat chamber leads to significant reductions in the required processing time and in the cost of the required energy.

A conventional large forced hot air heat chamber is modified to permit reversing the direction and velocity of the hot air flow. The variable velocity airflow is accomplished through the use of polyphase AC fan motors and variable frequency drives. The variable frequency drives also facilitate smooth reversing of the fans. A programmable logic controller is used to control fan speed and direction, facilitating cycle adjustments required for various loads of material. The programmable logic controller may also be used to control the chamber heating element or burner.

The method and operation of the present invention may be used for heat chambers of varying size, mechanical configuration and product processes. It is contemplated that this method applies equally to counter-top laboratory or manufacturing heat chambers, walk in chambers, mechanical or conveyor feed units, or to very large heat chambers that may be loaded by fork lift, conveyor or other heavy equipment. The operational effects will be similar for heat chambers using electrical or gas radiant heat or convective heat generated using gas, liquid or solid fuels. The product processes that may benefit from the present invention may include but are not limited to, manufacturing, recycling, material drying, food product processes and raw materials handling.

By way of example, for a large forced hot air heat chamber, the best overall performance was produced with airflow of 65,000 cubic feet per minute. The high volume airflow provided a high heat carrying capacity and ensured air turbulence for improved air mixing. The airflow direction was reversed every 15 minutes during the warm-up period when the air temperature was less than the set temperature and the burner was continuously on. Once the air temperature reached the set temperature, the burner cycled on and off and the fans reversed each time the burner changed state. Fan reversal increases air turbulence and improves mixing of the air. In addition, air flow within the heat chamber is affected by the product load and load configuration, each unique load creates different low pressure pockets or dead spots where the heated air does not effectively circulate. When the fan direction is reversed and the overall air flow is changed, the low pressure areas around the product load move to different areas surrounding the product. In the case where the product is substantially symmetrical and the air flow is exactly opposite, the low pressure area moves to the opposite side of the product. However, it is understood that product configurations vary along with air flow direction which may create indeterminate movements of the effective low pressure area. The described mode of operation is provided through use of a logic controller and an application specific program. This method and operation of the present invention, shortened the overall heating cycle by 10 to 20 percent with approximately the same degree of savings in energy costs as compared to the more conventional methods.

These modifications, installed using commercially available components and equipment, provide a variable speed, reversing airflow system in a large heat chamber. The modified chamber is capable of safely and efficiently heating various amounts of materials to a nearly uniform temperature throughout.

The objective of the invention is to produce an improved heating chamber capable of reducing heating times and costs for various loads of materials. It is based on sound thermodynamic principles that have been confirmed in use. The improved heating chamber increases production rates and reduces process costs.

It is understood that the processes and methods described may have many yet unidentified applications and describing it for heating products is for illustration purposes and is not intended to limit its utility.

These and other features and advantages of the disclosure will be set forth and will become more fully apparent in the detailed description that follows and in the appended claims. The features and advantages may be realized and obtained by the instruments and combinations particularly pointed out in the appended claims. Furthermore, the features and advantages of the disclosure may be learned by the practice of the methods or will be obvious from the description, as set for herein.

MAJOR PROCESSING EQUIPMENT LIST

For example the heating chamber modifications may be accomplished by the following major processing equipment:

1. Commercial heat chamber or kiln to be modified as described,

2. Variable frequency motor drive or drives,
3. Polyphase electrical motor or motors,
4. Fan or fans,
5. Heat generator, may be electric or fuel burner, and,
6. Programmable logic controller.

BRIEF DESCRIPTION OF THE DRAWINGS

The following description of the embodiments can be understood in light of the Figures, which illustrate specific aspects of the embodiments and are part of the specification. Together with the following description, the Figures demonstrate and explain the principles of the embodiments. In the Figures the physical dimensions of the embodiment may be exaggerated for clarity. The same reference numerals in different drawings represent the same element, and thus their descriptions may be omitted.

DETAILED DESCRIPTION OF THE INVENTION

Figure 1A:
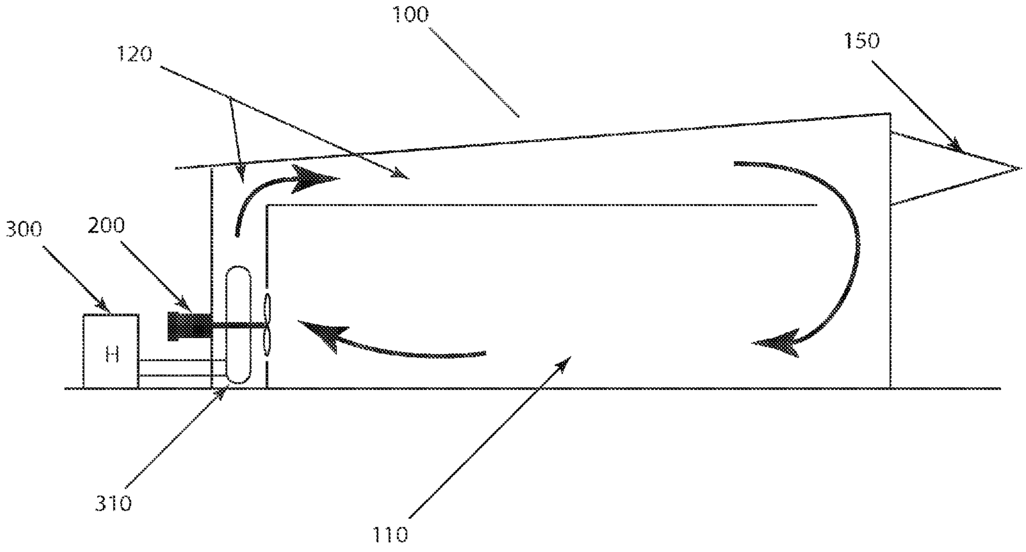
FIG. 1A illustrates a side view of a heat chamber showing a forward air flow direction.

For the purposes of promoting an understanding of the principles in accordance with the disclosure, reference will be made to the embodiments illustrated in the drawings and specific language will be used to describe the same. It will nevertheless be understood that no limitation of the scope of the disclosures is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure.

As used in this specification and the appended claims, the singular forms “a,” “an,” and “the” include plural referents unless the context clearly dictates otherwise. In describing and claiming the present disclosure, the following terminology will be used in accordance with the definitions set out below. As used herein, the terms “comprising,” “including,” “containing,” “characterized by,” and the grammatical equivalents thereof are inclusive or open-ended terms that do not exclude additional, unrecited elements of method processes.

The disclosure relates to the modification of and a method for operation of a heat chamber to improve heat distribution, reduce heating time and reduce energy consumption.

Each of FIGS. 1A, 1B, 2A and 2B show a large heat chamber 100 having an interior capacity 110 with and exterior door 150. Heated air is provided by heater 300 which may be, but is not limited to a heat generator such as an electric or gas radiant heater or a convective heater. Heat is introduced into chamber 100 via the burner stack/diffuser 310 and into plenum 120 which routes the heat toward the front wall of the chamber interior 110. Polyphase fans 200 are used to mix the heated air, increase and direct air circulation and may be used to exhaust the heat chamber 100 once a heating cycle is complete. Excess chamber pressure can be bled off or vented through chamber vent 151.

Figure 1B:
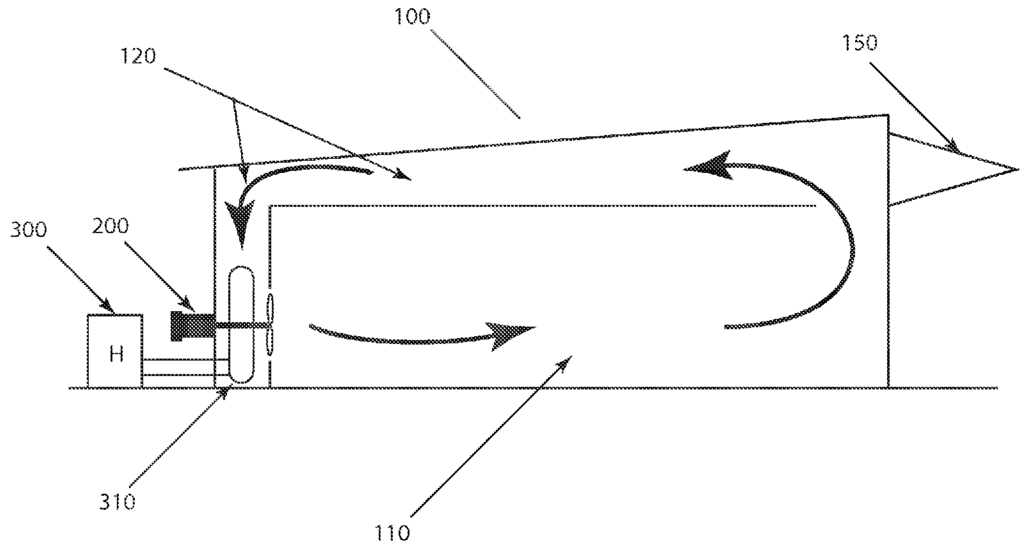
FIG. 1B illustrates a side view of a heat chamber showing a reverse air flow direction.
Figure 2A:
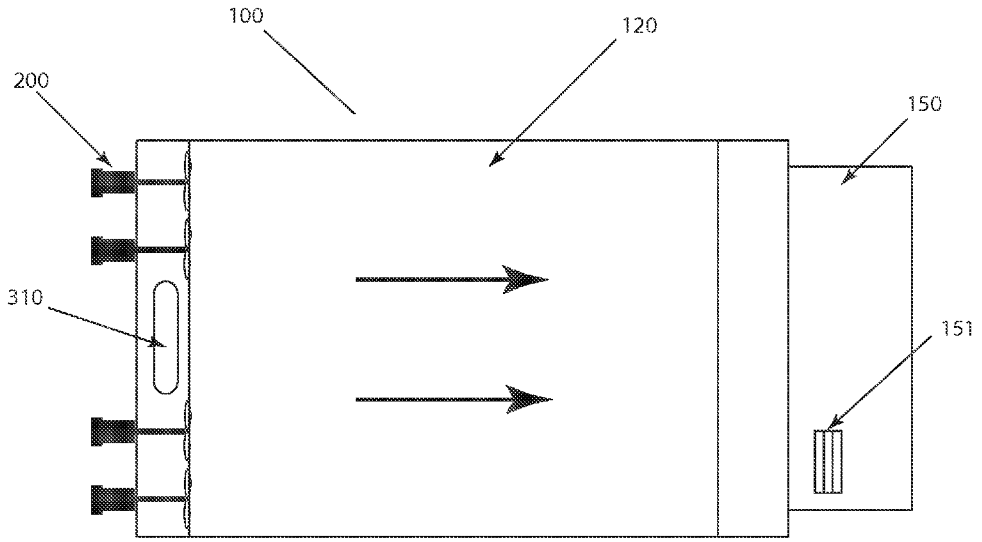
FIG. 2A illustrates a plan view of a heat chamber showing a forward air flow direction, and, FIG. 2B illustrates a plan view of a heat chamber showing a reverse air flow direction.
Figure 2B:
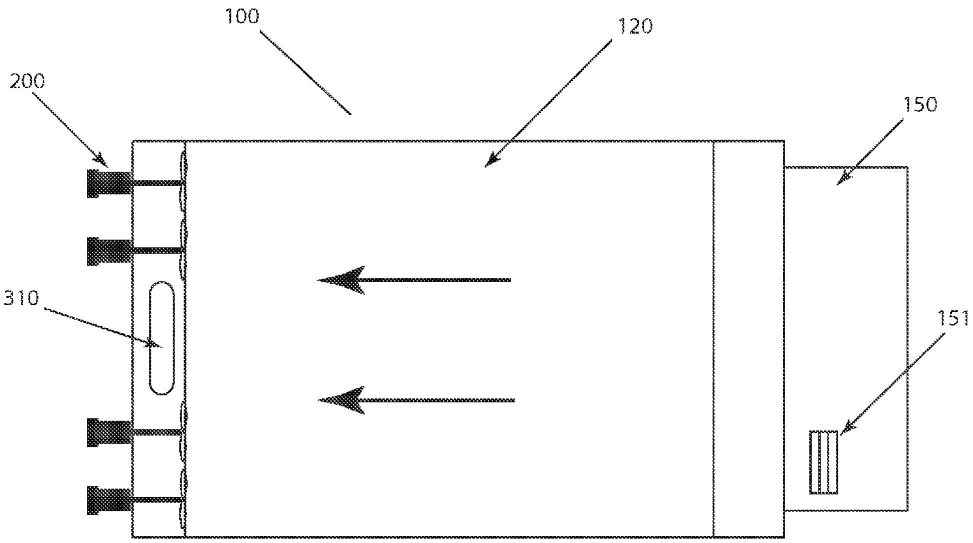

FIGS. 1A and 2A conceptually show the air flow pattern within heat chamber 100 with the heat flow routed in a forward direction. While FIGS. 1B and 2B show the air flow in a reverse direction.

The invention claimed is:

1. Method of operating a heat chamber comprising:
providing a heat chamber having;
 a programmable logic controller,
 a heat source,
 at least one polyphase circulation fan having a variable frequency drive and,
 the programmable logic controller programed to control the direction of the at least one polyphase circulation fan;
starting the heat source,
 the heat source operating intermittently, from a first on state, to a second off state, and,
 the programmable logic controller reversing direction of the at least one polyphase circulation fan each time the heat source changes state.

2. The method of claim 1 wherein the heat source operates constantly until the heat chamber reaches a predetermined temperature.

3. The method of claim 2 wherein the programmable logic controller reverses the direction of the at least one polyphase fan at a predetermined time interval.

4. The method of claim 1 wherein the programmable logic controller reverses direction of the at least one polyphase fan each time the heat source enters the first on state.

5. The method of claim 1 wherein the programmable logic controller reverses direction of the at least one polyphase fan each time the heat source enters the second off state.

6. The method of claim 1 wherein the programmable logic controller is programmed to control the speed of the least one polyphase fan.

7. The method of claim 1 wherein the programmable logic controller is programmed to control the output of the heat source.

* * * * *